(12) United States Patent
Hwang

(10) Patent No.: US 9,258,396 B2
(45) Date of Patent: Feb. 9, 2016

(54) HAND-HELD ELECTRONIC DEVICE HAVING ROLLED-UP SCREEN AND DISPLAY METHOD THEREOF

(71) Applicant: Richard Hwang, New Taipei (TW)

(72) Inventor: Richard Hwang, New Taipei (TW)

( * ) Notice: Subject to any disclaimer, the term of this patent is extended or adjusted under 35 U.S.C. 154(b) by 0 days.

(21) Appl. No.: 14/147,744

(22) Filed: Jan. 6, 2014

(65) Prior Publication Data

US 2014/0194165 A1    Jul. 10, 2014

(30) Foreign Application Priority Data

Jan. 10, 2013  (TW) .............................. 102100901 A

(51) Int. Cl.
*H04B 1/38*      (2015.01)
*H04M 1/02*     (2006.01)
*G06F 1/16*      (2006.01)
*G06F 3/147*    (2006.01)

(52) U.S. Cl.
CPC ........... *H04M 1/0268* (2013.01); *G06F 1/1652* (2013.01); *G06F 1/1677* (2013.01); *G06F 3/147* (2013.01); *H04M 1/0237* (2013.01); *G09G 2340/0407* (2013.01); *G09G 2380/02* (2013.01)

(58) Field of Classification Search
CPC ............................ G06F 1/1652; H04M 1/0268
USPC .......................................... 455/566, 347, 348
See application file for complete search history.

(56) References Cited

U.S. PATENT DOCUMENTS

| 7,426,107 | B2 * | 9/2008 | Yeh et al. ................. | 361/679.27 |
| 7,558,057 | B1 * | 7/2009 | Naksen et al. ........... | 361/679.56 |
| 8,174,628 | B2 * | 5/2012 | Matsushita et al. .......... | 348/836 |
| 8,711,566 | B2 * | 4/2014 | O'Brien ........................ | 361/724 |
| 2002/0070910 | A1 * | 6/2002 | Fujieda et al. ................. | 345/85 |
| 2004/0049743 | A1 * | 3/2004 | Bogward ....................... | 715/531 |
| 2005/0176470 | A1 * | 8/2005 | Yamakawa .................... | 455/566 |
| 2009/0051830 | A1 * | 2/2009 | Matsushita et al. .......... | 348/836 |
| 2010/0033435 | A1 * | 2/2010 | Huitema ....................... | 345/173 |
| 2010/0053081 | A1 * | 3/2010 | Jee et al. ....................... | 345/157 |

FOREIGN PATENT DOCUMENTS

JP        2003-198683        *    7/2003  .............. H04M 1/02

* cited by examiner

*Primary Examiner* — Duc M Nguyen

(57) ABSTRACT

A hand-held electronic device having a rolled-up screen comprises a flexible screen which can be partially received within a casing by a reeling mechanism in such a manner that the displaying function can still be performed by the flexible screen partially exposed outside the casing. When the flexible screen is pulled out and entirely exposed outside of the casing, the entire flexible screen can be used for image-displaying. Thus, advantages in both the high displaying quality of a large screen and excellent portability of a small-sized hand-held electronic device can be attained.

7 Claims, 7 Drawing Sheets

HAND-HELD ELECTRONIC DEVICE HAVING ROLLED-UP SCREEN AND DISPLAY METHOD THEREOF

This application claims the benefit of Taiwan Patent Application Serial No. 102100901, filed Jan. 10, 2013, the subject matter of which is incorporated herein by reference.

BACKGROUND OF INVENTION

1. Field of the Invention

The invention relates to a hand-held electronic device having a rolled-up screen, and more particularly to the hand-held electronic device having a rolled-up screen that is applicable to a cellular phone or a tablet computer, for which, while a flexible screen thereof is at an initial position by having the flexible screen to be reeled inside a casing via a reeling mechanism, the cellular phone or the tablet computer can perform as a normal cellular phone or tablet computer, and for which, while the flexible screen is at an extended position by having the flexible screen to be pulled out of the casing, the cellular phone or the tablet computer can perform as a device having a broad display screen.

2. Description of the Prior Art

Currently, the hand-held electronic device such as a cellular phone, a personal digital assistant, a GPS guide apparatus, a tablet computer and palm-size electronic play machine is usually equipped with a fixed-size display screen; in particular, a small-size display screen. Such an electronic device having a small-size screen is good in portability, but is ill in the limited display area, by which the image resolution and the applicability of a touch screen are problems. On the other hand, though the display screen can be enlarged so as to enhance the display area, the entertainment quality and the touch-control operability, yet the whole volume occupation is then too large to be in the field of portability or hand-holding. For example, the touch-control display screen for the smart phone has been increased from the 3" screen. the 4" screen, and finally to the 5" screen. In spite that the display screen has been made broader so as to ensure a better screen displaying and the viewing quality, yet such a size for the hand-held electronic device is too much for the female customers. Definitely, for those female customers, the definition of the portable electronic device with an enlarged display screen might not be equal to the hand-held device anymore.

Recently. various flexible screens have been developed, such as Korean Samsung's flexible AMOLED. Japan TDK's flexible OLED, Korean LG Display's plastic electronic paper screen, and Taiwan ITRI's touch AMOLED ultra-thin film screen and so on. Based on the modern technology, the thickness of the flexible touch screen can be down to 0.3 mm, and the flexible touch screen can be rolled into a cylinder with a radius at least less than 2.5 mm. Nevertheless, for the smart phones equipped with the flexible screens, the current development is still stayed in the stage of a prototype model with a flexible screen. Though the flexible screen is introduced to the smart phone, yet the concept of flexibility is at the device body itself, not at the size of the display screen. Namely. though a larger-sized flexible screen can be applied to a smart phone. yet such a bigger size in the screen does only result in a cumbersome machine for the smart phone, which is definitely away from the original design concept in hand-holding and portability.

SUMMARY OF THE INVENTION

Accordingly, it is the primary object of the present invention to provide a hand-held electronic device having a rolled-up screen and a corresponding display method for the hand-held electronic device, in both of which a reeling mechanism is introduced to elastically roll one portion of the flexible screen into the casing, but leaves another portion thereof to expose outside the casing as a small-size display screen. In the case that the flexible screen is pulled out of the casing so as to form an extended-size screen, a broader display screen can thus be obtained. Hence, advantages in having both a large-size screen for quality displaying and a small-size screen for hand-held convenience can be achieved by the hand-held electronic device having a rolled-up screen in accordance with the present invention.

In the present invention, a preferred embodiment of the hand-held electronic device having a rolled-up screen includes:

a casing;

a flexible screen for displaying images thereon;

a reeling mechanism, connected with the flexible screen so as to reel elastically the flexible screen between an extended position and an initial position, a first area of the flexible screen being exposed outside the casing and a second area thereof being retrieved inside the casing while the flexible screen is at the initial position, both the first area and the second area being exposed outside the casing to form an integrated third area while the flexible screen is pulled to the extended position;

a screen-detecting module for detecting whether the flexible screen is at the initial position or at the extended position and generating a detection signal accordingly; and an image-controlling module for controlling image-displaying on the flexible screen based on the detection signal, connected with the flexible screen and the screen-detecting module, controlling the flexible screen to display only on the first area while the screen-detecting module determines that the flexible screen is at the initial position, controlling the flexible screen to display on the third area while the screen-detecting module determines that the flexible screen is at the extended position.

In one embodiment of the present invention, the casing further includes a main body, an extendable portion and at least a supportive member extending between the main body and the extendable portion, the extendable portion being adhered to one lateral side of the main body while the flexible screen is at the initial position, the extendable portion being pulled away from the lateral side and supported at the main body by the at least one supportive member while the flexible screen is at the extended position.

In one embodiment of the present invention, the reeling mechanism is mounted inside the extendable portion, the extendable portion being adhered to the lateral side and the second area of the flexible screen being retrieved inside the extendable portion by the reeling mechanism while the flexible screen is at the initial position, the extendable portion being pulled away the lateral side so as to have the second area of the flexible screen to be extended between the lateral side and the extendable portion while the flexible screen is at the extended position.

In one embodiment of the present invention, wherein the reeling mechanism further includes a reel spring for providing an elastic pulling force to retrieve the second area of flexible screen back into the extendable portion.

In one embodiment of the present invention, the hand-held electronic device further includes a positioning mechanism for providing a positioning function to the flexible screen, such that the flexible screen is able to keep positions while facing no external forcing.

In one embodiment of the present invention, the at least one supportive member has thereon a plurality of rig structures, the positioning mechanism further has a buckling mechanism located inside the main body at a position corresponding to the at least one supportive member, and the positioning function is obtained by having the buckling mechanism to pair each one of a plurality of the rig structures on the at least one supportive member.

In one embodiment of the present invention, the hand-held device is a cellular phone and further includes:

a processor module, having at least one processor;

a communication module, electrically connected with the processor module, at least providing a communication function, further including an antenna;

a human-machine module, electrically connected with the processor module, at least providing a user to operate the hand-held device and a data-transmission function, the communication module furthering including at least one of an I/O port, a control button, a microphone, a speaker and an image-capturing module:

a power module, at least electrically connected with the processor module, providing power to the hand-held device, further having a battery; and a display module, electrically connected with the processor module and the flexible screen, further including image-displaying functions of the flexible screen controlled by the screen-detecting module and the image-controlling module.

To achieve the aforesaid objects, an exemplary embodiment of a display method for the foregoing hand-held electronic device in accordance with the present invention includes the steps of:

providing a hand-held electronic device having a rolled-up screen, wherein the hand-held electronic device includes: a casing. a flexible screen, and a reeling mechanism for reeling elastically the flexible screen between an extended position and an initial position, a first area of the flexible screen being exposed outside the casing and a second area thereof being retrieved inside the casing while the flexible screen is at the initial position, both the first area and the second area being exposed outside the casing to form an integrated third area while the flexible screen is pulled to the extended position;

detecting whether the flexible screen is at the initial position or at the extended position and generating a detection signal accordingly;

based on the detection signal, determining a size of an image for displaying, the size of the image being equal to a size of the first area while the detection signal is realized as that the flexible screen is at the initial position. the size of the image being equal to a size of the third area while the detection signal is realized as that the flexible screen is at the extended position; and controlling the flexible screen to display the image according to the size of the image, displaying the image only on the first area if the size of the image is equal to the size of the first area, displaying the image on the third area if the size of the image is equal to the size of the third area.

In one embodiment of the present invention, the image on the third area while the display screen is at the extended position is simple an enlarged image of the same image on the first area while the display screen is at the initial position.

All these objects are achieved by the hand-held electronic device having a rolled-up screen and the corresponding display method for the hand-held electronic device described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a hand-held electronic device having a rolled-up screen and a corresponding display method for the hand-held electronic device. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1A:
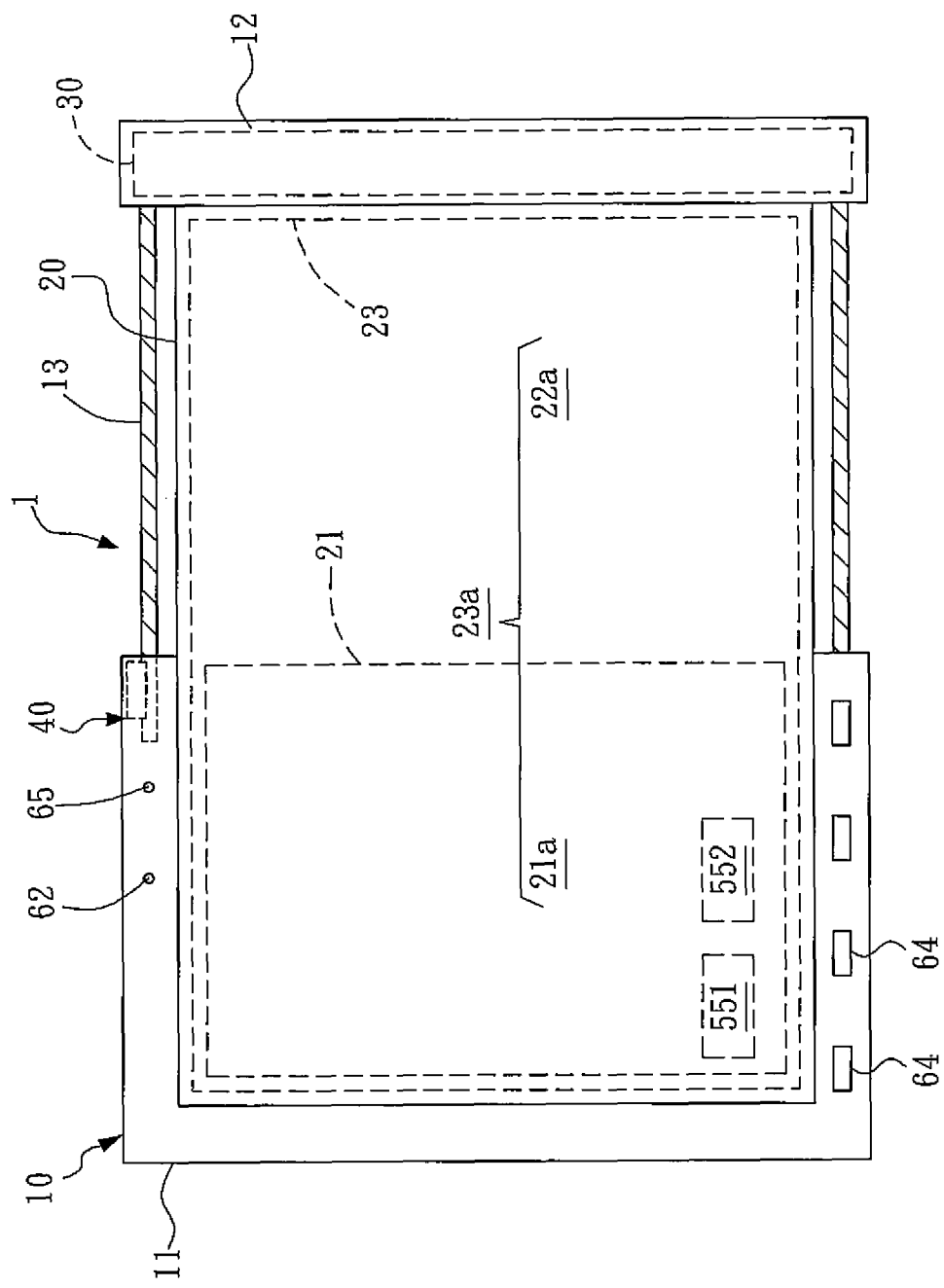
FIG. 1A is a schematic front view of a preferred embodiment of the hand-held electronic device in accordance with the present invention, in which the flexible screen is at an extended position.
Figure 1B:
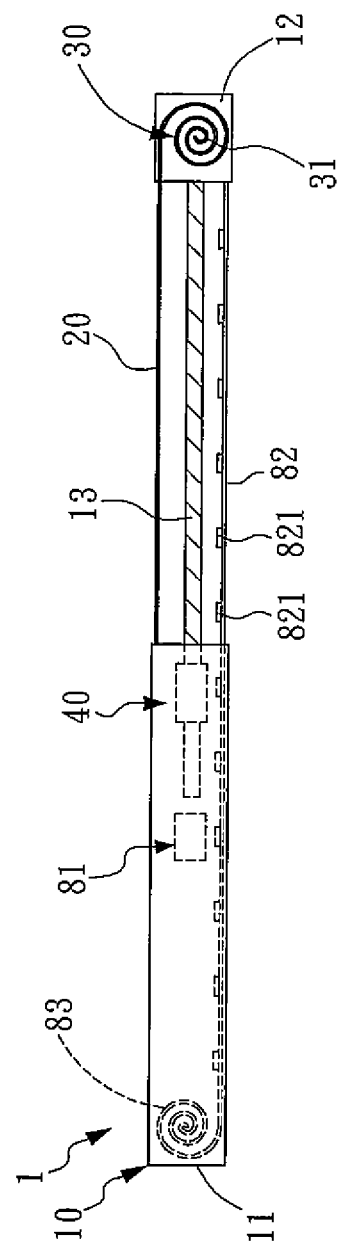
FIG. 1B is a bottom view of FIG. 1A.
Figure 2A:
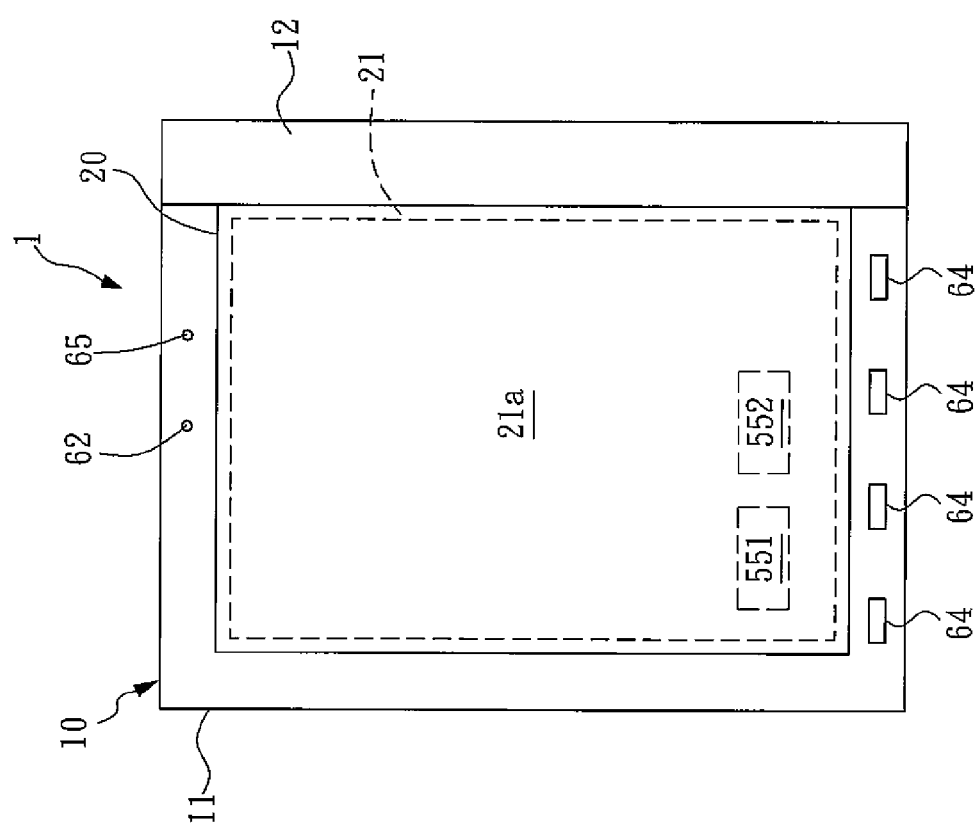
FIG. 2A is another front view of FIG. 1A, in which the flexible screen is at an initial position.
Figure 2B:
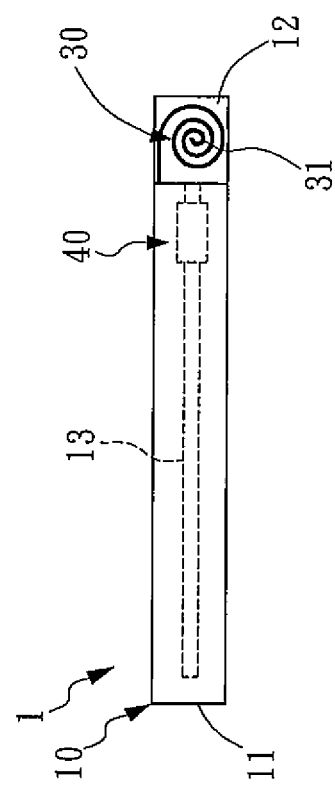
FIG. 2B is a bottom view of FIG. 2A.

Referring now to FIG. 1A, FIG. 1B, FIG. 2A and FIG. 2B, an exemplary embodiment of the hand-held electronic device having a rolled-up screen 1 in accordance with the present invention is shown in various application views, in which FIG. 1A is a schematic front view of the hand-held electronic device 1 with the flexible screen 20 positioned at an extended position, FIG. 1B is a bottom view of FIG. 1A, FIG. 2A is another front view of FIG. 1A with the flexible screen 20 positioned at an initial position, and FIG. 2B is a bottom view of FIG. 2A.

In this embodiment, the hand-held electronic device 1 having a rolled-up screen includes a casing 10, a flexible screen 20, a reeling mechanism 30, a screen-detecting module 551 and an image-controlling module 552. The casing 10 forming the appearance of the hand-held electronic device 1 provides an internal accommodation space for containing all the related elements of the hand-held electronic device 1. The flexible screen 20 can be reeled into a cylindrical structure for easy storage, and on the other hand can be pulled to form a plain surface for image-displaying thereon. In this embodiment, the flexible screen 20 is preferably embodied as a flexible AMOLED touch screen, and also can be embodied as any other type of flexible screen.

The reeling mechanism 30 is connected to the flexible screen 20 so as thereby able to have the flexible screen 20 to be pulled or unreeled from the reeling mechanism 30 to the extended position, or to reel elastically the flexible screen 20 back to the initial position. In the case that the flexible screen 20 is at the initial position as shown in FIG. 2A, the first area 21a of the flexible screen 20 (the area circled by the dashed lines 21 in either FIG. 1A or FIG. 2A) is exposed outside the casing 10, while the second area 22a of the flexible screen 20 (the area formed inside the dashed lines 23 of FIG. 1A by eliminating the first area 21a) retrieved (rolled up, in particular) by the reeling mechanism 30 is not exposed outside the casing 10. While the flexible screen 20 is pulled or extended to the extended position as shown in FIG. 1A, both the first area 21a and the second area 22a of the flexible screen 20 are exposed to the front surface of the casing 10. At this time, the integrated area of the first area 21a and the second area 22a is defined as the third area 23a (the area circled by dashed lines 23 in FIG. 1A). Namely, while the flexible screen 20 is retrieved to the initial position, only a portion thereof (i.e. the first area 21a) is active for image-displaying. On the other hand, while the flexible screen 20 is pulled or extended to the extended position, a broader area made up by combining the first area 21a and the second area 22a of the flexible screen 20, i.e. the third area 23a, is available for image-displaying.

In this embodiment, the casing 10 further includes a main body 11, an extendable portion 12 and at least one supportive member 13 extendable between the main body 11 and the extendable portion 1. The reeling mechanism 30 is particularly mounted inside the extendable portion 12. The reeling mechanism 30 further includes a reel spring 31 for providing a spring force to roll elastically back the second area 22a of the flexible screen 20 into the extendable portion 12. The extendable portion 12 is originally adhered to one lateral side of the main body 11, and can be pulled away from the main body 11 but still connected solidly with the main body 11 by the supportive members 13. While the flexible screen 20 is at the initial position, the extendable portion 12 is attached to the lateral side of the main body 11, with the second area 22a of the flexible screen 20 rolled up inside the extendable portion 12 by the reeling mechanism 30. While the flexible screen 20 is at the extended position, the extendable portion 12 is pulled away the lateral side of the main body 11 but with the supportive members 12 to connect therebetween. At this time, the second area 22a of the flexible screen 20 is extended and exposed between the lateral side of the main body 11 and the extendable portion 12. Of course, in another embodiment not shown herein, the reeling mechanism 30 can be located inside the main body 11, not in the extendable portion 12.

The screen-detecting module 551 is to detect whether the flexible screen 20 screen is at the initial position or at the extended position and further to generate a detection signal accordingly. The image-controlling module 552 connected with the flexible screen 20 and the screen-detecting module 551 can base on the detection signal to control the image-displaying of the flexible screen 20. While the screen-detecting module 551 determines that the flexible screen 20 is at the initial position, the image-controlling module 552 would control the flexible screen 20 to have the image to be displayed only on the first area 21a. While the screen-detecting module 551 determines that the flexible screen 20 is at the extended position, the image-controlling module 552 would control the flexible screen 20 to display on the third area 23a. Upon such an arrangement, though the volume of the hand-held electronic device having a rolled-up screen 1 can be minimized by having the flexible screen 20 positioned at the initial position so as to benefit the hand-held portability, yet a tiny portion (the first area 21a) of the flexible screen 20 can still be implemented to process the image-displaying and the touch-control. On the other hand, while a broader display screen is needed, the flexible screen 20 is pulled to extend to the extended position so that the whole span (the third area 23a, i.e. the combination of the first area 21a and the second area 22a) of the flexible screen 20 can be used to perform image-displaying or touch-control. Definitely, by providing the hand-held electronic device of the present invention, both the viewing quality for the bigger-size screen and the hand-held portability for the smaller-size screen can thus be obtained.

In the present invention, one embodiment of the screen-detecting module 551 can construct a mechanical, optical or magnetic detection switch (not shown herein) between the main body 11 and the extendable portion 12. In the case that the main body 11 contacts with the extendable portion 12, the screen-detecting module 551 would judge that the flexible screen 20 is at the initial position, and then generate a corresponding detection signal. In the case that the main body 11 and the extendable portion 12 are separate, the screen-detecting module 551 would judge that the flexible screen 20 is at the extended position, and also generate another corresponding detection signal. Such type of operation for the screen-detecting module 551 is simple and low-cost, but can only be applicable to judge two positions (complete contact and complete extended) of the flexible screen 20.

In another embodiment of the screen-detecting module 551, the flexible screen 20 can be judged at various positions between the position of complete contact and the position of complete extended. In such a screen-detecting module 551, different states of extension for the flexible screen 20 can be defined and read by the screen-detecting module 551. In the embodiment shown in FIG. 1B, the screen-detecting module 551 can includes a back film 82 located on a surface of the casing 10 opposing to the flexible screen 20 and positioned between the main body 11 and the extendable portion 12, a plurality of detection points 821 on the back film 82, a sensor 81 located inside the main body 11, and a back film reel spring 83 inside the main body 11. The back film reel spring 83 can provide a spring force for retrieving elastically the back film 82 back into the main body 11. While the back film 82 is pulled out of the main boy 11 with the extendable portion 12, the sensor 81 can detect the moving direction of the flexible screen 20 through reading the passing detection points 821, and thereby the extended distance of the extendable portion 12 can thus be detected. Also, the exposed size of the second area 22a of the flexible screen 20 out of the main body 11 can then be computed, and the detection signal can be generated accordingly as well to the image-controlling module 552. Upon such an arrangement, the image-controlling module 552 can base on the detection signal to control the image-displaying of the flexible screen 20. In particular, even only a portion of the second area 22a of the flexible screen 20 is pulled out of the main body 11, a relevant size of the image can be displayed on the available portion of the third area 23a. Similarly, the aforesaid detection pair including the sensor 81 and the detection points 821 can also be replaced by the existing art in mechanical, optical or magnetic detection technology.

Figure 3:
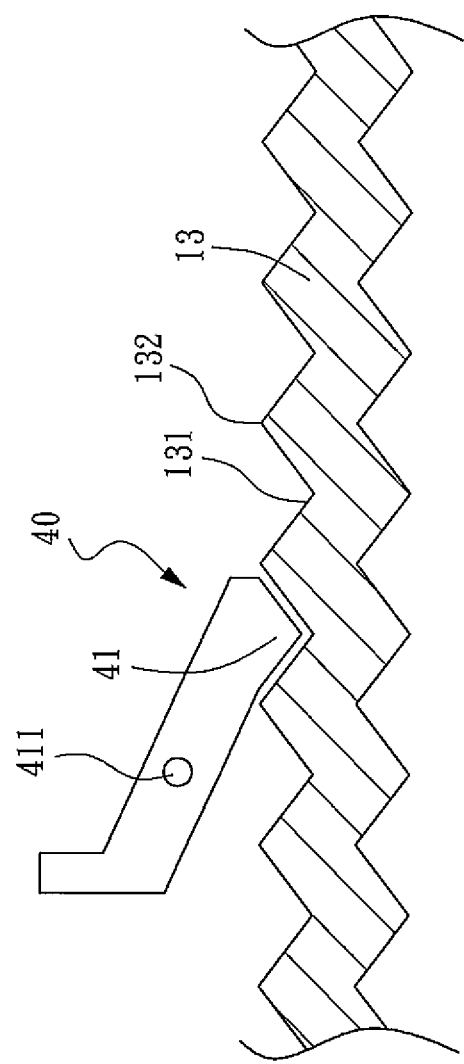
FIG. 3 shows schematically a preferred positioning mechanism for the hand-held electronic device in accordance with the present invention.

In the present invention, the hand-held electronic device 1 can further include a positioning mechanism 40 for providing a positioning function to the flexible screen 20 and the supportive members 13, such that the flexible screen 20 can keep positions or maintain its state upon a situation free of external forcing. For example, the state can be the extended position, the initial position, or any position between the extended position and the initial position. As shown in FIG. 3, an embodiment of the positioning mechanism 40 for the hand-held electronic device having a rolled-up screen 1 can include a plurality of rig structures 131, 132 arranged along the supportive member 13. For example, but not limited to the example, the supportive member 13 can be designed as a screw bar or a teeth rack. The positioning mechanism 40 includes a buckling mechanism 41 located inside the main body 11 at a position corresponding to the supportive member 13. Also, a spring member 411 is connected at the pivotal shaft of the buckling mechanism 41 so as to have the front end of the buckling mechanism 41 able to contact any rig structure 131 or 132 of the supportive member 13. Through the front end of the buckling mechanism 41 to contact and thus buckle up a specific rig structure 131 or 132 of the supportive member 13, the positioning function of the present invention can be thus achieved. In addition, through adjusting the spring forcing of the spring member 411 at the pivotal shaft of the buckling mechanism 41 or through arranging the angling of the rig structures 131, 132 of the supportive member 13 the forms the buckling restraint with the front end of the buckling mechanism 41, the positioning function can also be obtained and adjustable to achieve the operation of having the extendable portion 12 to be pulled close or pushed away with respect to main body 11 of the casing 10. Of course, the positioning mechanism 40 of the present invention is not limited to the structuring disclosed by FIG. 3. In an embodiment not shown herein, the positioning mechanism 40 can be constructed as a skeleton mechanism of a typical umbrella which can perform the aforesaid pulling, pushing and positioning operations similar to those described above. Also, the strength of the skeleton mechanism can withstand the resilience as that provided by the aforesaid reel spring upon the reeling mechanism, in which the extended screen can keep positions against the spring force, and in which little forcing can trigger the screen to retrieve back to the initial position. Furthermore, in an embodiment not shown herein, the supportive member 13 can be formed as a U-shape slender beam, to replace the aforesaid round slender bar. Under such a circumstance, while in pairing the back film 82 of FIG. 1B, the whole appearance of the hand-held electronic device 1 can be compactly looked by having the longitudinal groove formed by opposing walls of the U-shape slender beam to slide along thereinside both the flexible screen 20 and the back film 82 during the pushing and pulling operation of the extendable portion 12 with respect to the main body 11.

Figure 4:
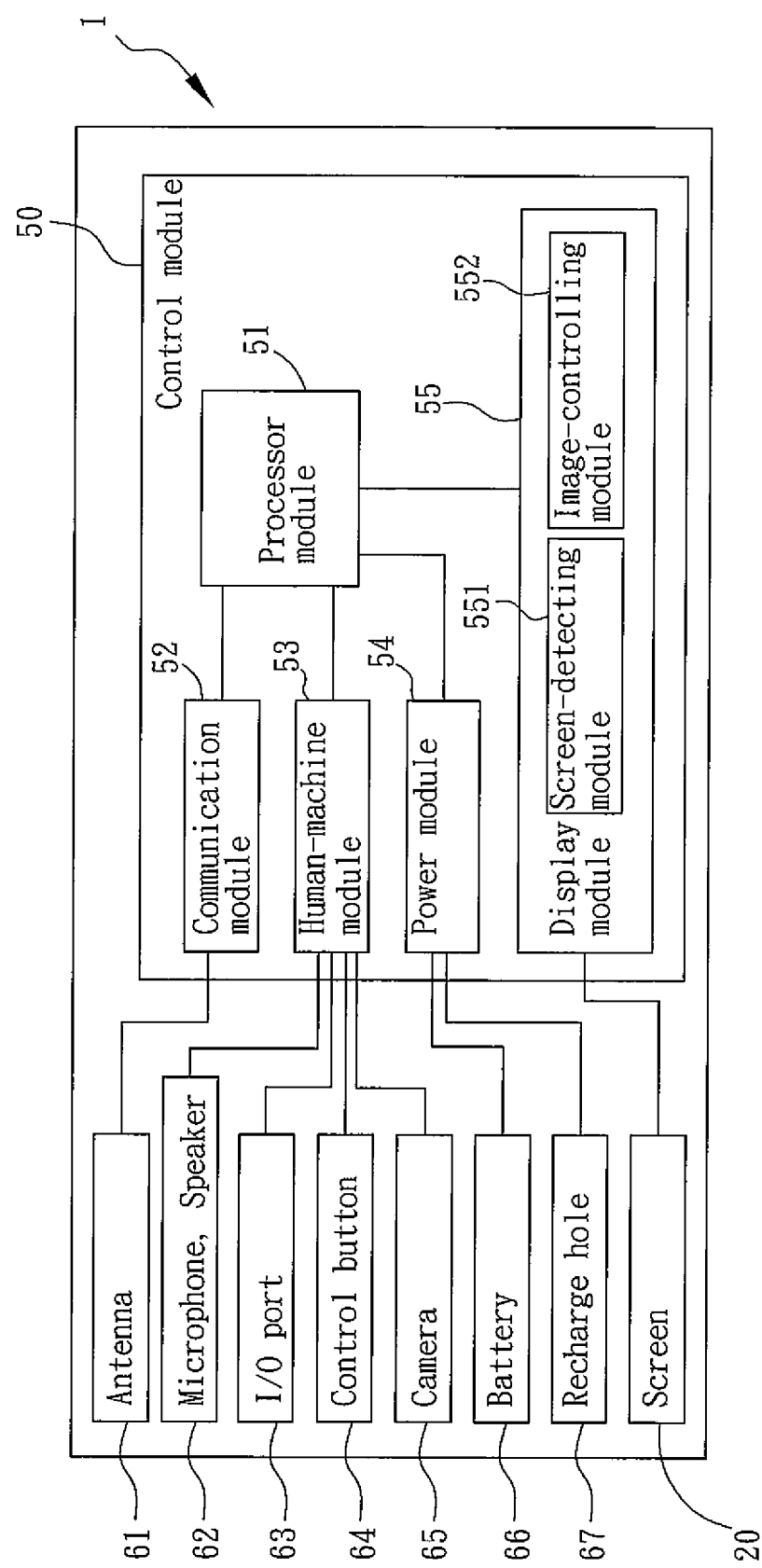
FIG. 4 is a block diagram of a cellular phone as an exemplary embodiment of the hand-held electronic device in accordance with the present invention.

The hand-held electronic device having a rolled-up screen 1 in accordance with the present invention is applicable to almost any type of the hand-held electronic devices, such as, but not limited to, traditional cellular phones, smart phones, PDAs, GPS apparatuses, tablet computers, palm-size game machines and so on. In the embodiment shown in FIG. 4, the hand-held electronic device 1 is structured as a cellular phone. The hand-held electronic device 1 includes the aforesaid casing 10 (having the main body 11, the extendable portion 12 and the supportive member 13), the aforesaid flexible screen 20, the aforesaid reeling mechanism 30, the aforesaid screen-detecting module 551, the aforesaid image-controlling module 552, the aforesaid positioning mechanism 40, a processor module 51, a communication module 52, a human-machine module 53, a power module 54 and a display module 55 in which the modules 51, 52, 53, 54 and 55 can be integrally formed as a control module 50 for providing required functions to the cellular phone.

In this embodiment, the processor module 51 can includes at least one processor. The communication module 52 is electrically connected with the processor module 51 and provides at least one function of mobile communication. The communication module 52 includes an antenna 61. The human-machine module 53 is electrically coupled to the processor module 51 and is to provide at least functions of receiving human operations and transmitting data. The communication module 53 further includes at least one of a microphone/speaker 62, an I/O port 63, a control button 64 (solid or pseudo), and an image-capturing module 65 (a camera, for example). The power module 54 is electrically connected at least with the processor module 51 and is to provide power to the hand-held electronic device 1. The power module 54 includes a battery 66, a recharging module and a recharge hole 67 for accepting an external charger (not shown in the figure). The display module 55 electrically coupling the processor module 51 and the flexible screen 20 further has the screen-detecting module 551 and the image-controlling module 552 to control the image-displaying of the flexible screen 20.

Figure 5:
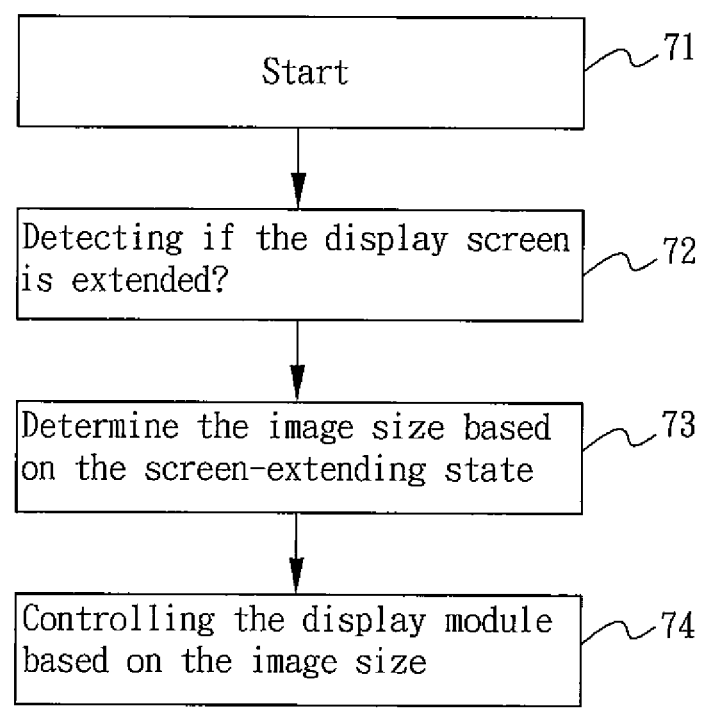
FIG. 5 is a flowchart of a preferred display method for the hand-held electronic device having a rolled-up screen in accordance with the present invention.

Referring now to FIG. 5, a flowchart of a preferred display method for the hand-held electronic device having a rolled-up screen in accordance with the present invention is shown. The display method includes the following steps.

Step 71: Start to perform the operation of screen displaying. Firstly, provide a hand-held electronic device 1 having a rolled-up screen. The hand-held electronic device 1 includes: a casing 10, a flexible screen 20, and a reeling mechanism 30 for reeling elastically the flexible screen 20 between an extended position and an initial position. While the flexible screen 20 is at the initial position, a first area 21a of the flexible screen 20 is exposed outside the casing 10, and also a second area 22a thereof is reeled back to nest inside the casing 10. While the flexible screen 20 is pulled to the extended position, both the first area 21a and the second area 22a are exposed outside the casing 10 so as to form an integrated third area 23a as a broader application of the flexible screen 20.

Step 72: Detect whether the flexible screen 20 is at the initial position or at the extended position by a screen-detecting module 551, and generates a detection signal accordingly.

Step 73: An image-controlling module 552 judges the detection signal to determine a size of an image for displaying. While the detection signal is realized as that the flexible screen 20 is at the initial position, the size of the image is to meet or equal to the size of the first area 21a. Further, while the detection signal is realized as that the flexible screen 20 is at the extended position, the size of the image for displaying is then to meet or equal to the size of the third area 23a.

Step 74: A display module 50 controls the flexible screen 20 to display the image according to the size of the image. In the case that the size of the image is equal to the size of the first area 21a, displaying the image is only performed on the first area 21a. in the case that the size of the image is equal to the size of the third area 23a, displaying the image is performed in an enlarged way on the third area 23a.

In this embodiment, the image on the third area 23a while the flexible screen 20 is at the extended position is simple an enlarged image of the same image on the first area 21a while the flexible screen 20 is at the initial position. Namely, an enlarged image can be obtained by simply pulling the flexible screen 20 to the extended position from the initial position where the same image is shown in a smaller size.

While the present invention has been particularly shown and described with reference to a preferred embodiment, it will be understood by those skilled in the art that various changes in form and detail may be without departing from the spirit and scope of the present invention.

What is claimed is:

1. A hand-held electronic device having a rolled-up screen, comprising:
   a casing, further including a main body, an extendable portion and at least a supportive member extending between the main body and the extendable portion;
   a flexible screen for displaying images thereon, the flexible screen is a touch screen;
   a reeling mechanism, mounted inside the extendable portion and connected with the flexible screen so as to reel elastically the flexible screen between an extended position and an initial position;

a screen-detecting module for detecting whether the flexible screen is at the initial position or at the extended position and generating a detection signal accordingly; and an image-controlling module for controlling image-displaying on the flexible screen based on the detection signal, connected with the flexible screen and the screen-detecting module, controlling the flexible screen to display only on the first area while the screen-detecting module determines that the flexible screen is at the initial position, controlling the flexible screen to display on a third area while the screen-detecting module determines that the flexible screen is at the extended position;

wherein, while the flexible screen is at the initial position, a first area of the flexible screen is exposed outside the casing, a second area thereof is retrieved inside the casing, the extendable portion is adjacent to one lateral side of the main body, and the second area of the flexible screen is retrieved inside the extendable portion by the reeling mechanism;

wherein, while the flexible screen is at the extended position, both the first area and the second area are exposed outside the casing to form the integrated third area, the extendable portion is pulled away the lateral side so as to have the second area of the flexible screen to be extended between the lateral side and the extendable portion, and the extendable portion is supported at the main body by the at least one supportive member.

2. The hand-held electronic device having a rolled-up screen according to claim 1, further including a positioning mechanism for providing a positioning function to the flexible screen, such that the flexible screen is able to keep positions while facing no external forcing.

3. The hand-held electronic device having a rolled-up screen according to claim 2, wherein the at least one supportive member has thereon a plurality of rig structures, the positioning mechanism further has a buckling mechanism located inside the main body at a position corresponding to the at least one supportive member, and the positioning function is obtained by having the buckling mechanism to pair each one of a plurality of the rig structures on the at least one supportive member.

4. The hand-held electronic device having a rolled-up screen according to claim 1, wherein the hand-held device is a cellular phone, further including:
- a processor module, having at least one processor;
- a communication module, electrically connected with the processor module, at least providing a communication function, further including an antenna;
- a human-machine module, electrically connected with the processor module, at least providing a user to operate the hand-held device and a data-transmission function, the communication module furthering including at least one of an I/O port, a control button, a microphone, a speaker and an image-capturing module;
- a power module, at least electrically connected with the processor module, providing power to the hand-held device, further having a battery; and
- a display module, electrically connected with the processor module and the flexible screen, further including image-displaying functions of the flexible screen controlled by the screen-detecting module and the image-controlling module.

5. A display method for a hand-held electronic device, comprising the steps of:
providing a hand-held electronic device having a rolled-up screen, wherein the hand-held electronic device includes: a casing, a flexible screen, and a reeling mechanism for reeling elastically the flexible screen between an extended position and an initial position, the flexible screen is a touch screen, the casing further including a main body, an extendable portion and at least a supportive member extending between the main body and the extendable portion, the reeling mechanism being mounted inside the extendable portion; wherein, while the flexible screen is at the initial position, a first area of the flexible screen is exposed outside the casing, a second area thereof is retrieved inside the casing, the extendable portion is adjacent to one lateral side of the main body, and the second area of the flexible screen is retrieved inside the extendable portion by the reeling mechanism; wherein, while the flexible screen is at the extended position, both the first area and the second area are exposed outside the casing to form an integrated third area, the extendable portion is pulled away the lateral side so as to have the second area of the flexible screen to be extended between the lateral side and the extendable portion, and the extendable portion is supported at the main body by the at least one supportive member;

detecting whether the flexible screen is at the initial position or at the extended position and generating a detection signal accordingly;

based on the detection signal, determining a size of an image for displaying, the size of the image being equal to a size of the first area while the detection signal is realized as that the flexible screen is at the initial position, the size of the image being equal to a size of the third area while the detection signal is realized as that the flexible screen is at the extended position; and controlling the flexible screen to display the image according to the size of the image, displaying the image only on the first area if the size of the image is equal to the size of the first area, displaying the image on the third area if the size of the image is equal to the size of the third area.

6. The display method for a hand-held electronic device according to claim 5, wherein the image on the third area while the display screen is at the extended position is simple an enlarged image of the same image on the first area while the display screen is at the initial position.

7. The display method for a hand-held electronic device according to claim 6, wherein the hand-held device is a cellular phone, further including:
- a processor module, having at least one processor;
- a communication module, electrically connected with the processor module, at least providing a communication function, further including an antenna;
- a human-machine module, electrically connected with the processor module, at least providing a user to operate the hand-held device and a data-transmission function, the communication module furthering including at least one of an I/O port, a control button, a microphone, a speaker and an image-capturing module;
- a power module, at least electrically connected with the processor module, providing power to the hand-held device, further having a battery; and
- a display module, electrically connected with the processor module and the flexible screen, further including image-displaying functions of the flexible screen controlled by the screen-detecting module and the image-controlling module, wherein the screen-detecting module is to detect whether the flexible screen is at the initial position or at the extended position and further to generate a detection signal accordingly, wherein the image-controlling module connected with the flexible screen and the screen-detecting module bases on the detection signal to determine a size of an image for displaying on the flexible screen, the size of the image being equal to a size of the first area while the image-controlling module determines that the flexible screen is at the initial position, the size of the image being equal to a size of the third area while the image-controlling module determines that the flexible screen is at the extended position.

* * * * *